Oct. 2, 1928.
C. G. SEWELL
1,686,471
LAUNDRY ASSORTING APPARATUS
Filed Feb. 5, 1927
3 Sheets-Sheet 1
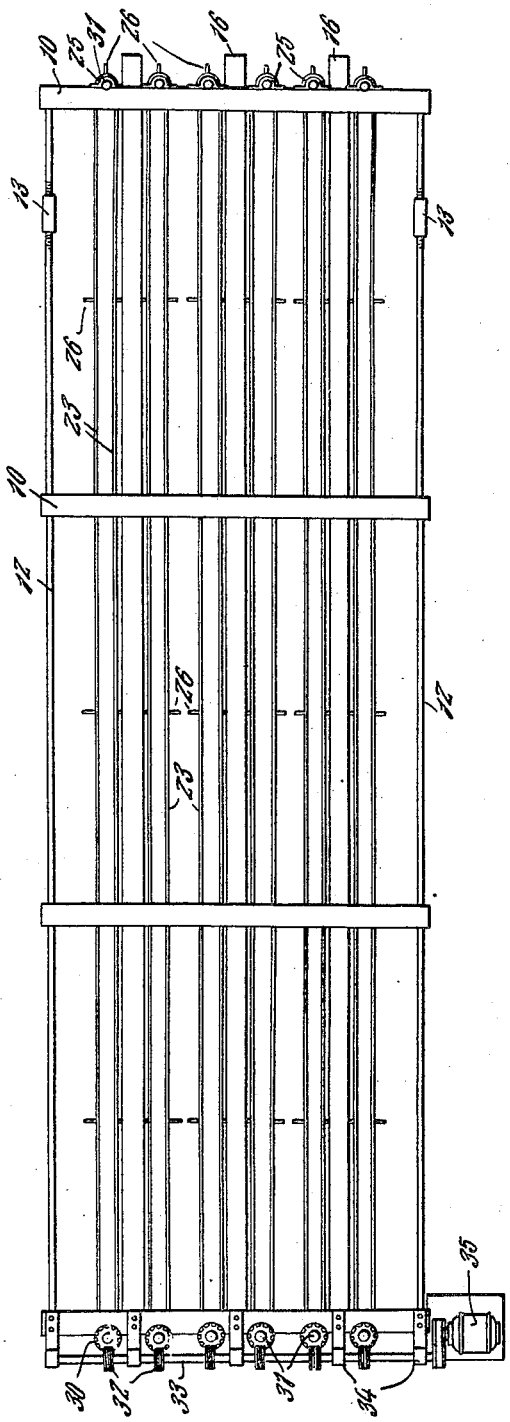
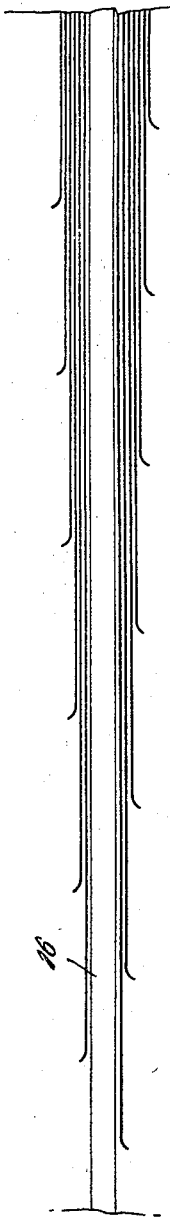
Cyrus G. Sewell
INVENTOR
BY Victor J. Evans
ATTORNEY Oct. 2, 1928.
C. G. SEWELL
1,686,471
LAUNDRY ASSORTING APPARATUS
Filed Feb. 5, 1927
3 Sheets-Sheet 2
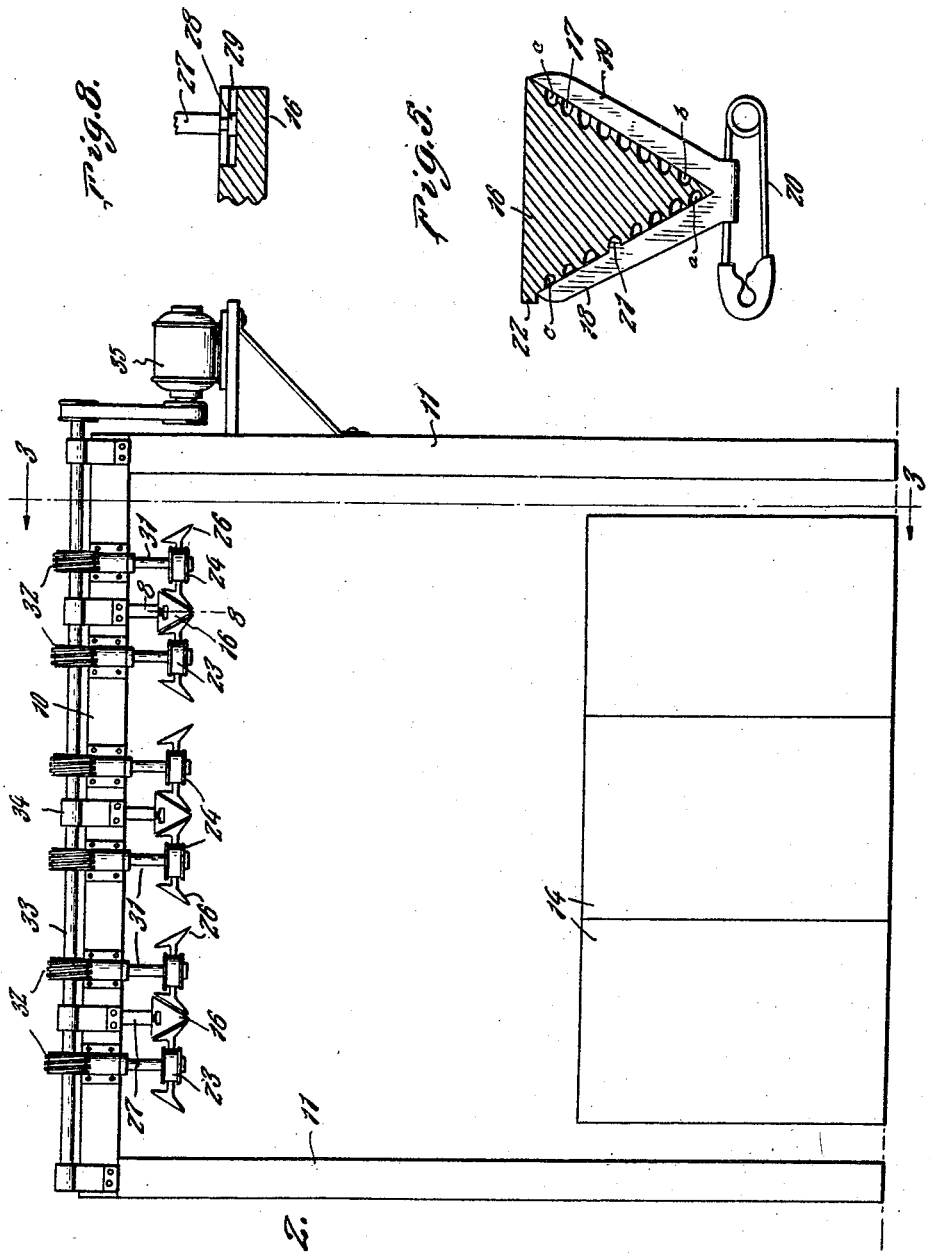

Oct. 2, 1928.
C. G. SEWELL
1,686,471
LAUNDRY ASSORTING APPARATUS
Filed Feb. 5, 1927
3 Sheets-Sheet 3
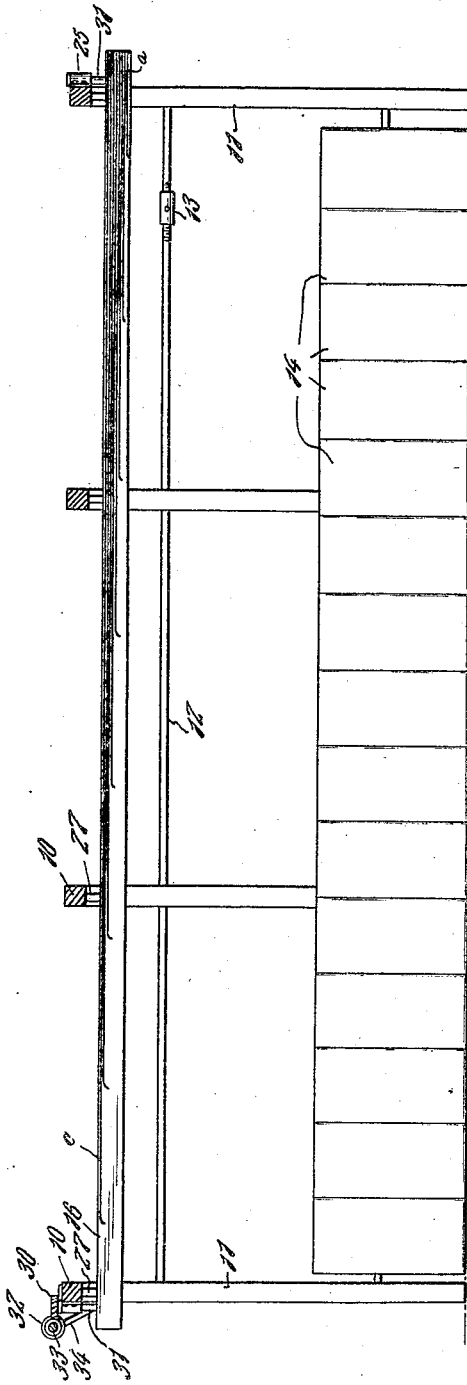
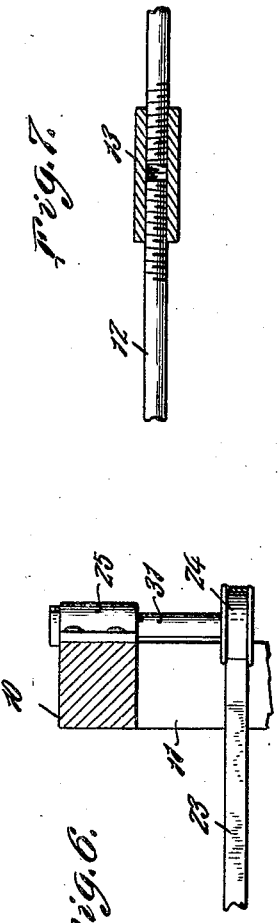

Patented Oct. 2, 1928.

1,686,471

UNITED STATES PATENT OFFICE.

CYRUS G. SEWELL, OF ABILENE, TEXAS.

LAUNDRY-ASSORTING APPARATUS.

Application filed February 5, 1927. Serial No. 166,267.

This invention relates to assorting apparatus and is especially adapted for use in laundries for distributing and sorting "rough dry" wash.

An object of the present invention is the provision of an apparatus of this character, by means of which articles of various types may be rapidly and accurately distributed to and deposited within different receptacles, the said means including a carrier designed to be attached to an article to be distributed, and arranged so that the article may be deposited only within the intended receptacle and thus avoid mistake.

Another object of the invention is the provision of an apparatus which in addition to the above and other advantages is simple in construction, reliable in use and may be operated at a low cost.

With the above and other objects in view, the invention further includes the following novel features and details of construction, to be hereinafter more fully described, illustrated in the accompanying drawings and pointed out in the appended claims.

In the drawings:—

Figure 1 is a top plan view of an assorting apparatus constructed in accordance with the invention.

Figure 2 is an end view.

Figure 3 is a section on the line 3—3 of Figure 2.

Figure 4 is a diagram illustrating the arrangement of the distributor bar grooves.

Figure 5 is an enlarged section taken transversely through the distributor bar and showing one of the carriers in elevation.

Figure 6 is a fragmentary section illustrating the manner of supporting the endless driving belts.

Figure 7 is a fragmentary view illustrating the means for regulating the tension of the driving belts.

Figure 8 is an enlarged fragmentary section taken on the line 8—8 of Figure 2.

Referring to the drawings in detail wherein like characters of reference denote corresponding parts, the invention as shown includes a supporting frame which is made up of spaced horizontally disposed bars 10 and vertical bars 11, the latter supporting the bars 10. A number of separate substantially U-shaped frames are thus provided. These frames are connected by means of bars 12 and the latter are of sectional formation, the sections being connected by an interiorly threaded sleeve or turnbuckle 13.

Positioned between the frames is a plurality of bins or receptacles 14. Any number of these bins or receptacles may be provided and for the purpose of illustration, there is shown three rows of receptacles with fifteen in each row.

The receptacles are open at the top and positioned above each row of receptacles is a distributor bar 16 with its associated mechanism. These bars are triangular in cross section so as to provide oppositely and upwardly inclined sides and these sides are provided with longitudinally extending grooves 17 whose lowest portions are preferably upon a plane lower than the lower edges of the grooves. The grooves of each bar 16 are of different lengths and are spaced one above the other as shown in Figures 3, 4 and 5 of the drawings. The grooves upon one side of the bar are staggered with respect to the grooves upon the opposite side as shown in Figure 5 and the lowermost groove indicated at $a$ is the shortest groove. The inner end of this groove terminates directly above the first receptacle 14 of the row, while the ends of the groove $b$ upon the opposite side of the bar terminate directly above the second receptacle. This arrangement is followed for each groove and receptacle, except that the two uppermost grooves $c$ are of the same length. As there are fifteen receptacles shown in each row and eight grooves upon each side of the bar 16, this permits the two uppermost grooves $c$ to be of the same length.

The invention further includes a number of carriers designed to be attached to the articles to be distributed. These carriers are preferably substantially V-shaped as shown in Figure 5 of the drawings and each includes an arm 18 and an arm 19. A pin 20 or other fastening device is attached to each carrier and provides means whereby the distributed article may be attached to the carrier. One of the arms of each carrier is provided with a projection 21 which is designed to be received within one of the grooves 17. As each carrier has its projection 21 differently located, each carrier will be designed for a particular groove of one of the bars 16 and in order to adapt a particular carrier for a particular bar only, the bars 16 are provided with a rib 22. The rib of each bar is of a different thickness and the arm 18 of the carrier is of such a length that it will fit only the bar for which it is intended. Further, the bars are of slightly different cross sectional area. For example, the bar to the left of Figure 2 may be the largest bar while the other two bars are of slightly decreasing size. Further, one of the arms of the carrier (the arm 19) is of greater length than the arm 18 so that positioning of the carrier upon the bar will be greatly facilitated.

The carriers are designed to be moved longitudinally of the bars 16 and for this purpose there are provided endless driving belts 23. One of these belts is positioned upon each side of each of the distributor bars and travels around grooved pulleys 24 which are suspended from suitable bearings 25 carried by the cross bars 10 of the frame. Extending from these belts 23 are spaced fingers 26 which are adapted to engage the carriers, the fingers being so arranged that one finger upon each side of a distributor bar will simultaneously engage each arm of the carrier so as to evenly move the same along the bar. When the carrier reaches the end of its particular groove, the lug 21 will leave the groove and the carrier will fall into its respective receptacle. By adjusting the threaded sleeve or turnbuckle 13, the tension of the belts may be regulated and to provide for this, relative movement is permitted between one of the U-shaped framed and the supporting means for the distributor bar. For this purpose, the distributor bars are supported by hanger arms 27 and the hanger bars at one end of the frame are provided with heads 28 which slidingly engage within grooves 29 which extend longitudinally of the bars.

The pulleys 24 at one end of the frame have worm gears 30 secured to their shafts 31 and these gears are engaged by worms 32 which are carried by a shaft 33. This last mentioned shaft is mounted in suitable bearings 34 carried by the frame and is driven preferably by means of an electric motor 35.

It will be apparent from the foregoing description and accompanying drawings that the carriers which are attached to the articles to be distributed may be placed so as to engage only a particular groove 17 of a particular distributor bar 16, so that when these carriers are moved along the bars they will be deposited only in a particular receptacle, so that it is practically impossible to deposit an article within the wrong receptacle.

The invention is susceptible of various changes in its form, proportions and minor details of construction and the right is herein reserved to make such changes as properly fall within the scope of the appended claims.

Having described the invention what is claimed is:—

1. An assorting apparatus comprising a plurality of receptacles open at the top, a distributor bar supported above the receptacles, carriers engageable with and movable longitudinally of the bar and adapted to carry the articles to be distributed, means to move the carriers and means controlled by the engagement between the carrier and bar to deposit a carrier within a particular receptacle and means carried by the bar to indicate the proper position of the carriage upon the bar.

2. An assorting apparatus comprising a plurality of receptacles open at the top, spaced distributor bars supported above the receptacles, carriers engageable with and movable longitudinally of the bars and adapted to carry the articles to be distributed, means to move the carriers and means controlled by the engagement between the carriers and bars to permit certain of the carriers to engage only a particular bar and to deposit a carrier within a particular receptacle.

3. An assorting apparatus comprising a plurality of receptacles open at the top, a distributor bar supported above the receptacles and having grooves of different lengths extending longitudinally thereof, carriers movable longitudinally of the bar and adapted to carry articles to be distributed, means to move the carriers and differently located means extending from each carrier to engage within a particular groove of the bar to deposit a carrier within a particular receptacle.

4. An assorting apparatus comprising a plurality of receptacles open at the top, a distributor bar supported above the receptacles, upwardly and outwardly inclined faces provided on said bar, said faces having longitudinally extending grooves therein of different lengths, with one of said grooves terminating above each of the receptacles, carriers movable longitudinally of the bar and adapted to carry articles to be distributed, means to move the carriers and means extending from each carrier to engage within a particular groove of the bar to deposit a carrier within a particular receptacle.

In testimony whereof I affix my signature.

CYRUS G. SEWELL.